United States Patent
Tanaka et al.

(10) Patent No.: US 9,897,810 B2
(45) Date of Patent: Feb. 20, 2018

(54) SPECTACLE-TYPE ELECTRONIC DEVICE AND ASSISTING METHOD

(71) Applicant: KABUSHIKI KAISHA TOSHIBA, Minato-ku, Tokyo (JP)

(72) Inventors: Akira Tanaka, Tokyo (JP); Yasuhiro Kanishima, Tokyo (JP); Kenichi Doniwa, Asaka Saitama (JP); Hiroaki Komaki, Tokyo (JP); Hiroki Kumagai, Tokyo (JP); Takashi Sudo, Tokyo (JP); Nobuhide Okabayashi, Tokyo (JP)

(73) Assignee: KBUSHIKI KAISHA TOSHIBA, Tokyo (JP)

( * ) Notice: Subject to any disclaimer, the term of this patent is extended or adjusted under 35 U.S.C. 154(b) by 36 days.

(21) Appl. No.: 14/979,241

(22) Filed: Dec. 22, 2015

(65) Prior Publication Data
US 2017/0059867 A1    Mar. 2, 2017

(30) Foreign Application Priority Data
Sep. 2, 2015   (JP) .................................. 2015-173034

(51) Int. Cl.
*G02B 27/01*   (2006.01)
*G02B 27/00*   (2006.01)

(52) U.S. Cl.
CPC ...... *G02B 27/0172* (2013.01); *G02B 27/0093* (2013.01); *G02B 2027/014* (2013.01); *G02B 2027/0141* (2013.01); *G02B 2027/0178* (2013.01)

(58) Field of Classification Search
None
See application file for complete search history.

(56) References Cited

U.S. PATENT DOCUMENTS

| | | | |
|---|---|---|---|
| 2012/0242560 A1* | 9/2012 | Nakada | G09G 3/3406 345/8 |
| 2014/0145079 A1 | 5/2014 | Omino | |
| 2014/0240349 A1 | 8/2014 | Tuukkanen | |

(Continued)

FOREIGN PATENT DOCUMENTS

| | | |
|---|---|---|
| JP | H05-211650 A | 8/1993 |
| JP | H05-234891 A | 9/1993 |

(Continued)

OTHER PUBLICATIONS

U.S. Appl. No. 14/979,169, filed Dec. 22, 2015 Non-Final Office Action dated Jun. 2, 2017.

*Primary Examiner* — Christopher Kohlman
(74) *Attorney, Agent, or Firm* — Rutan & Tucker, LLP

(57) ABSTRACT

According to one embodiment, a spectacle-type electronic device includes a signal processor, a screen and a communication module. The signal processor which modulates the illumination light from the light source to form a signal including individual identification information. The screen positioned at a particular location within an extension of a wearer's line of sight to display the image produced by the image display and illuminated by the light source. The communication processor which communicates with a corresponding electronic device to enable information of a target represented by the image displayed on the screen to be shared by the communication processor and the corresponding electronic device.

20 Claims, 15 Drawing Sheets

(56) References Cited

U.S. PATENT DOCUMENTS

| | | |
|---|---|---|
| 2014/0240484 A1 | 8/2014 | Kodama et al. |
| 2014/0351191 A1 | 11/2014 | Kon et al. |

FOREIGN PATENT DOCUMENTS

| | | |
|---|---|---|
| JP | H10-147411 A | 6/1998 |
| JP | 2000-354943 A | 12/2000 |
| JP | 2002-288294 A | 10/2002 |
| JP | 2003-196681 A | 7/2003 |
| JP | 2003-216687 A | 7/2003 |
| JP | 2004-102727 A | 4/2004 |
| JP | 2009-279193 A | 12/2009 |
| JP | 2010-271928 A | 12/2010 |
| JP | 2011-081737 A | 4/2011 |
| JP | 2011-118683 A | 6/2011 |
| JP | 2012-212991 A | 11/2012 |
| JP | 2013-020422 A | 1/2013 |
| JP | 2014-119786 A | 6/2014 |
| JP | 2014-164482 A | 9/2014 |
| JP | 2014-228725 A | 12/2014 |
| JP | 2015-075832 A | 4/2015 |
| JP | 2015-088175 A | 5/2015 |

* cited by examiner

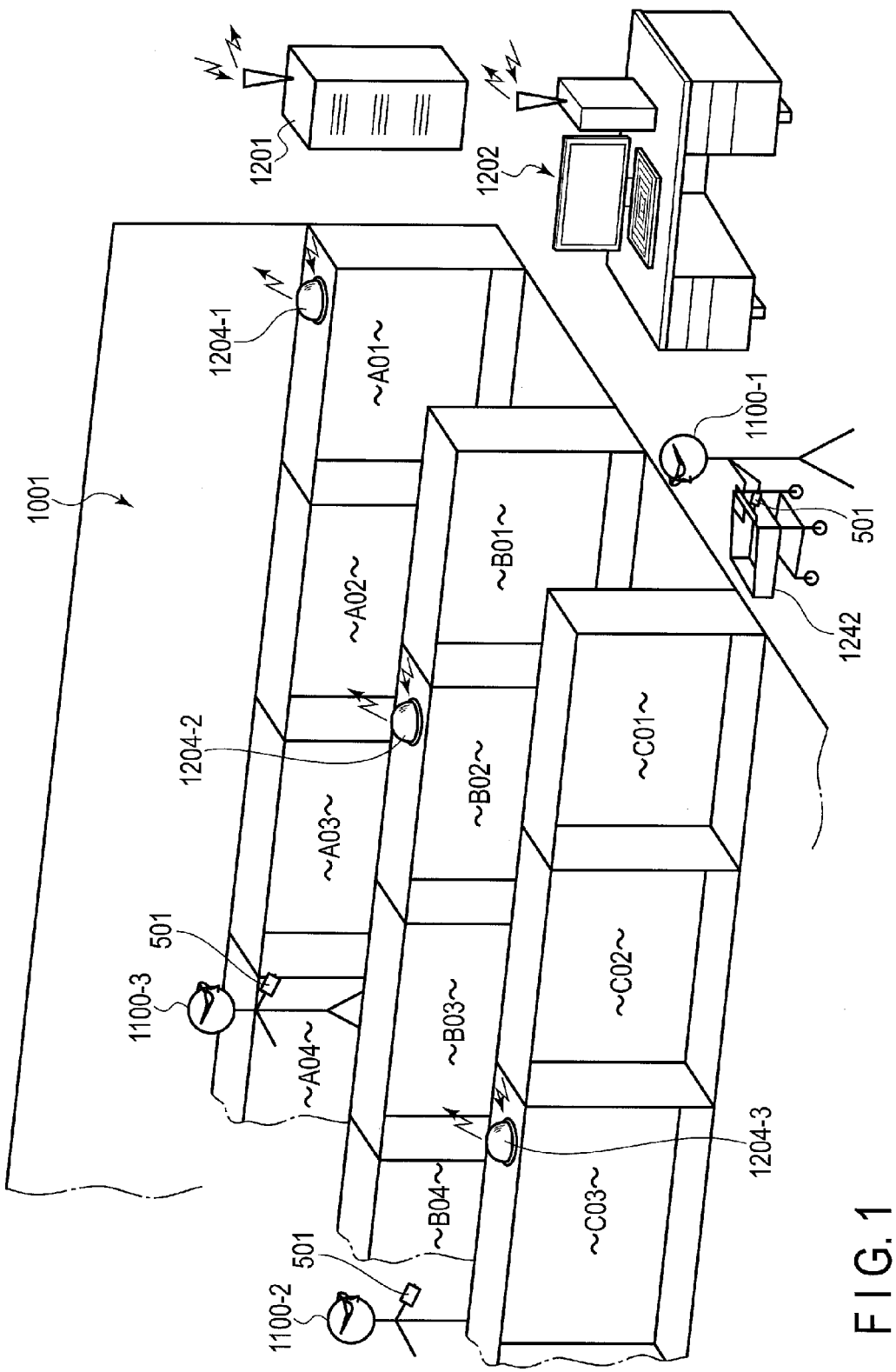
F I G. 1

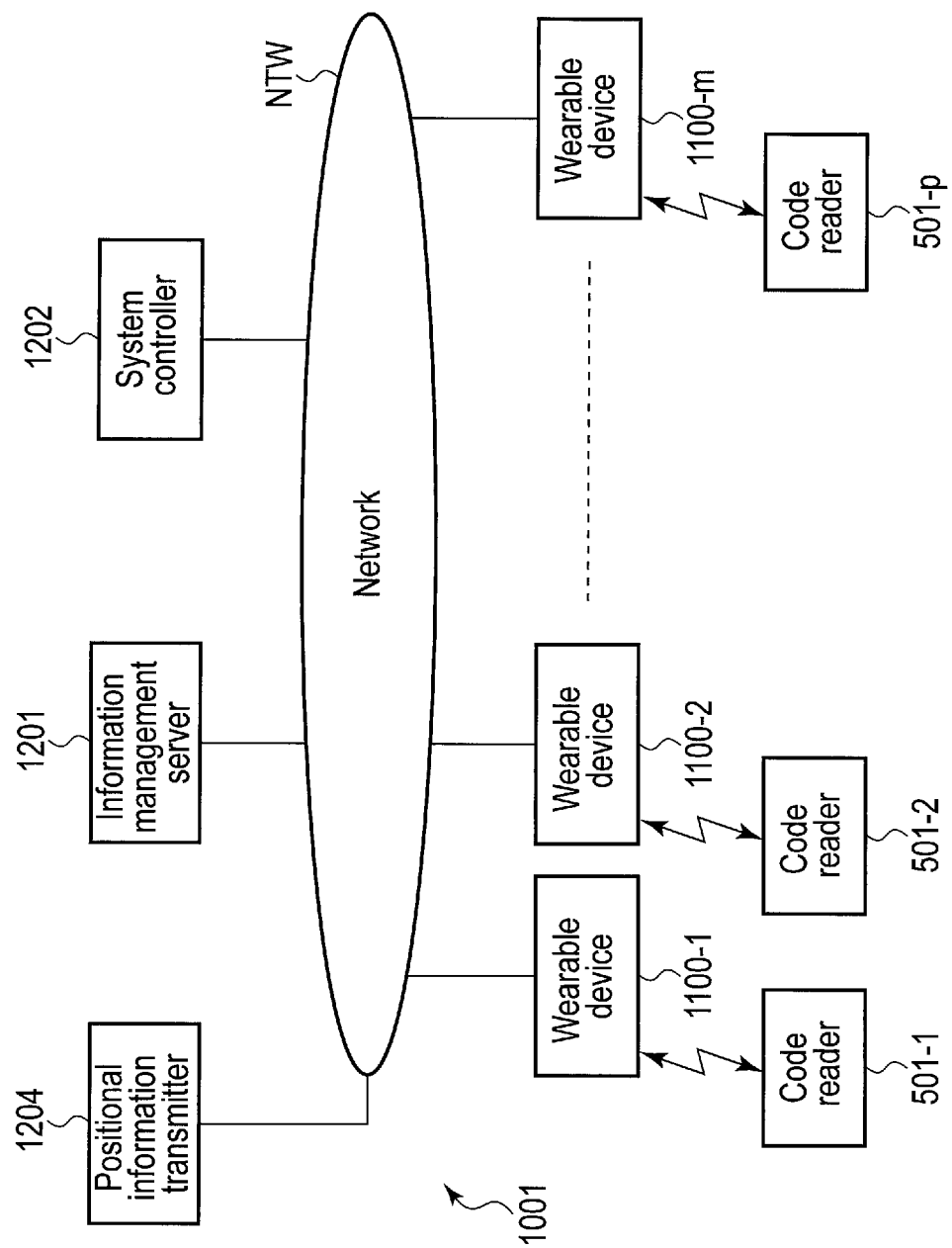
F I G. 4

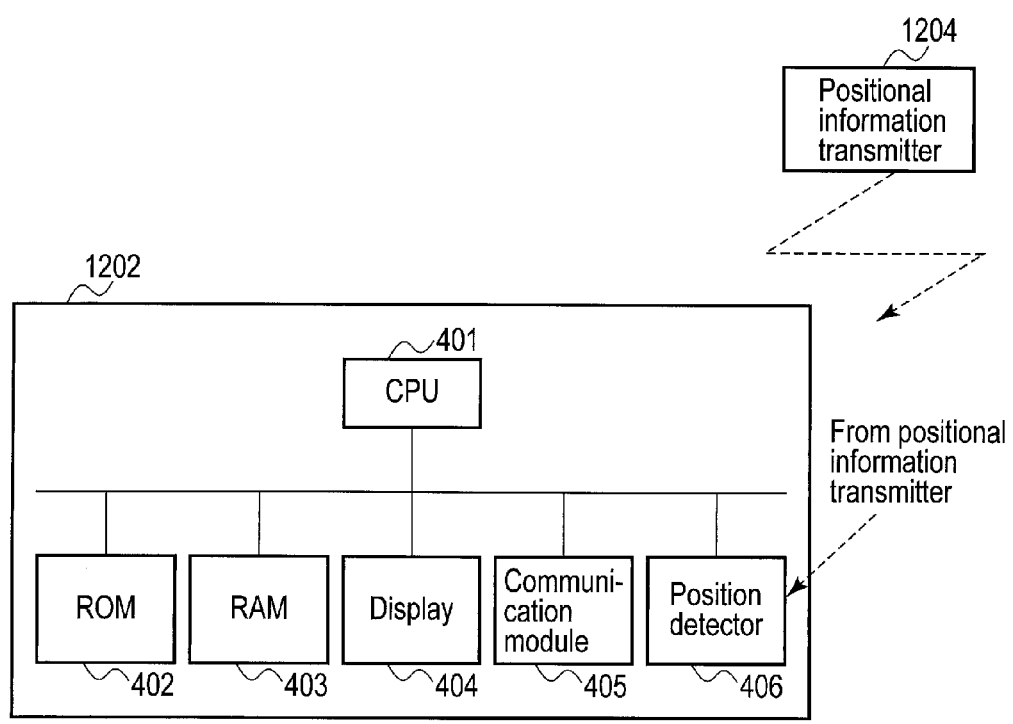
F I G. 7

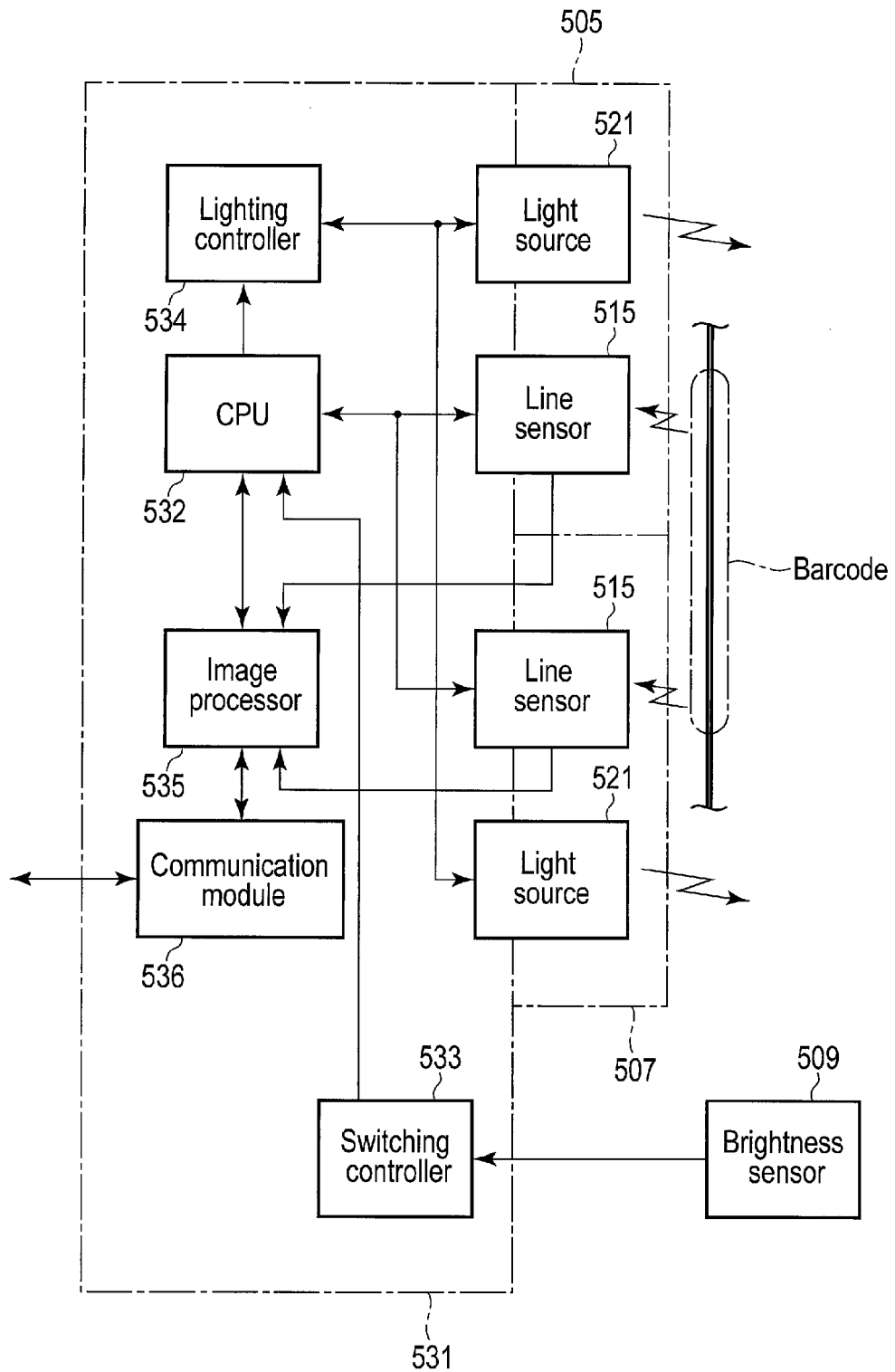
F I G. 10

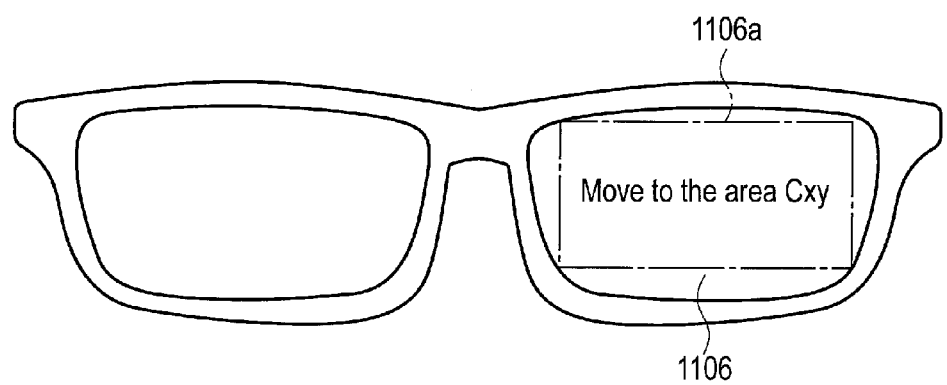
F I G. 12A
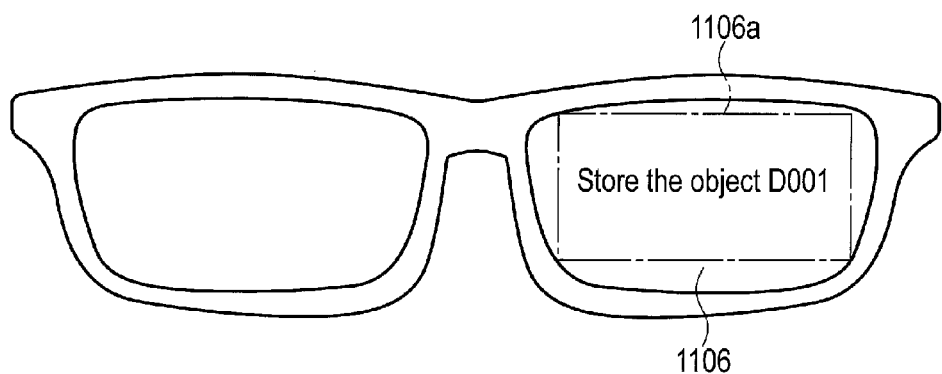
F I G. 12B

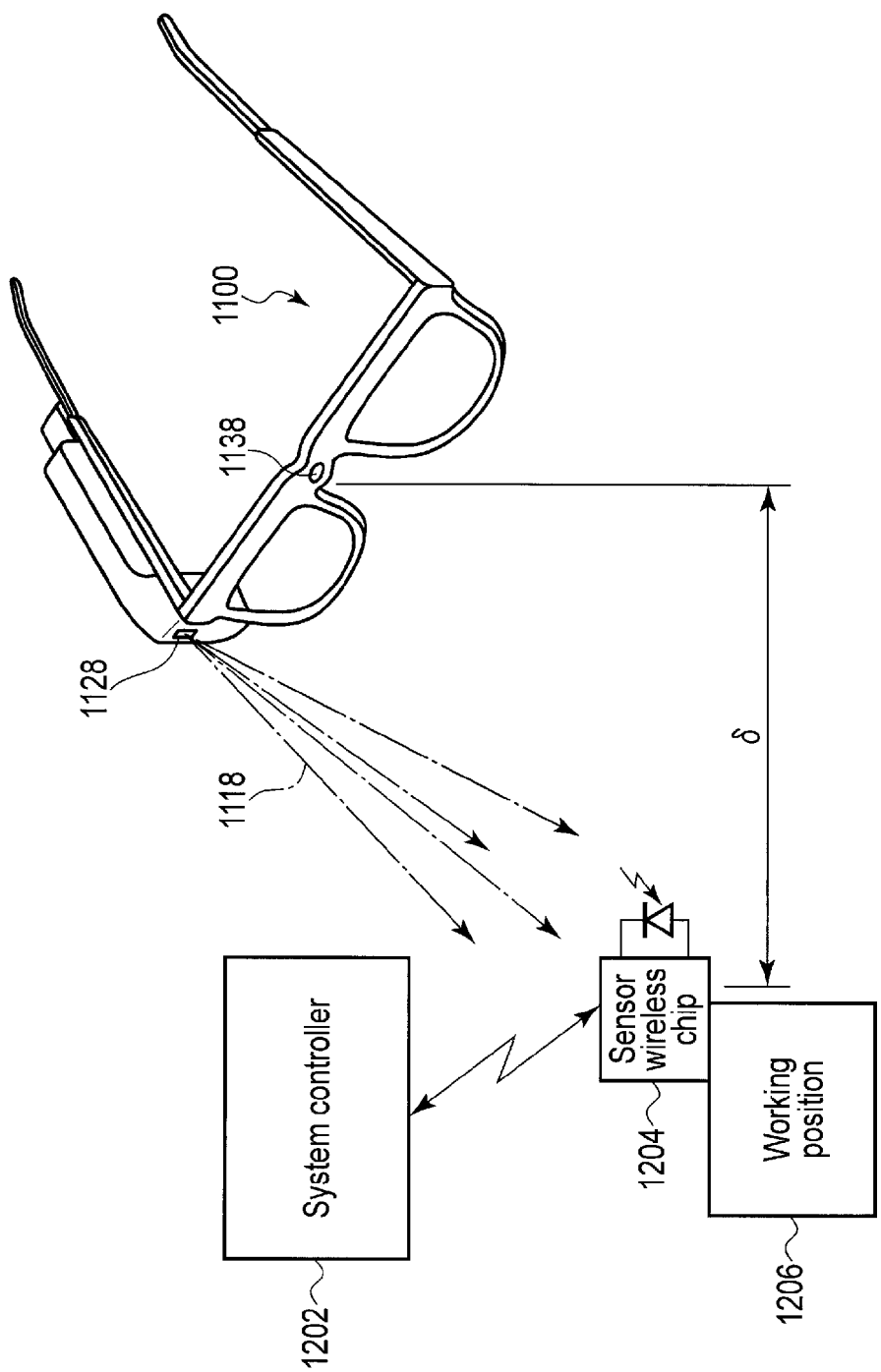
F I G. 13

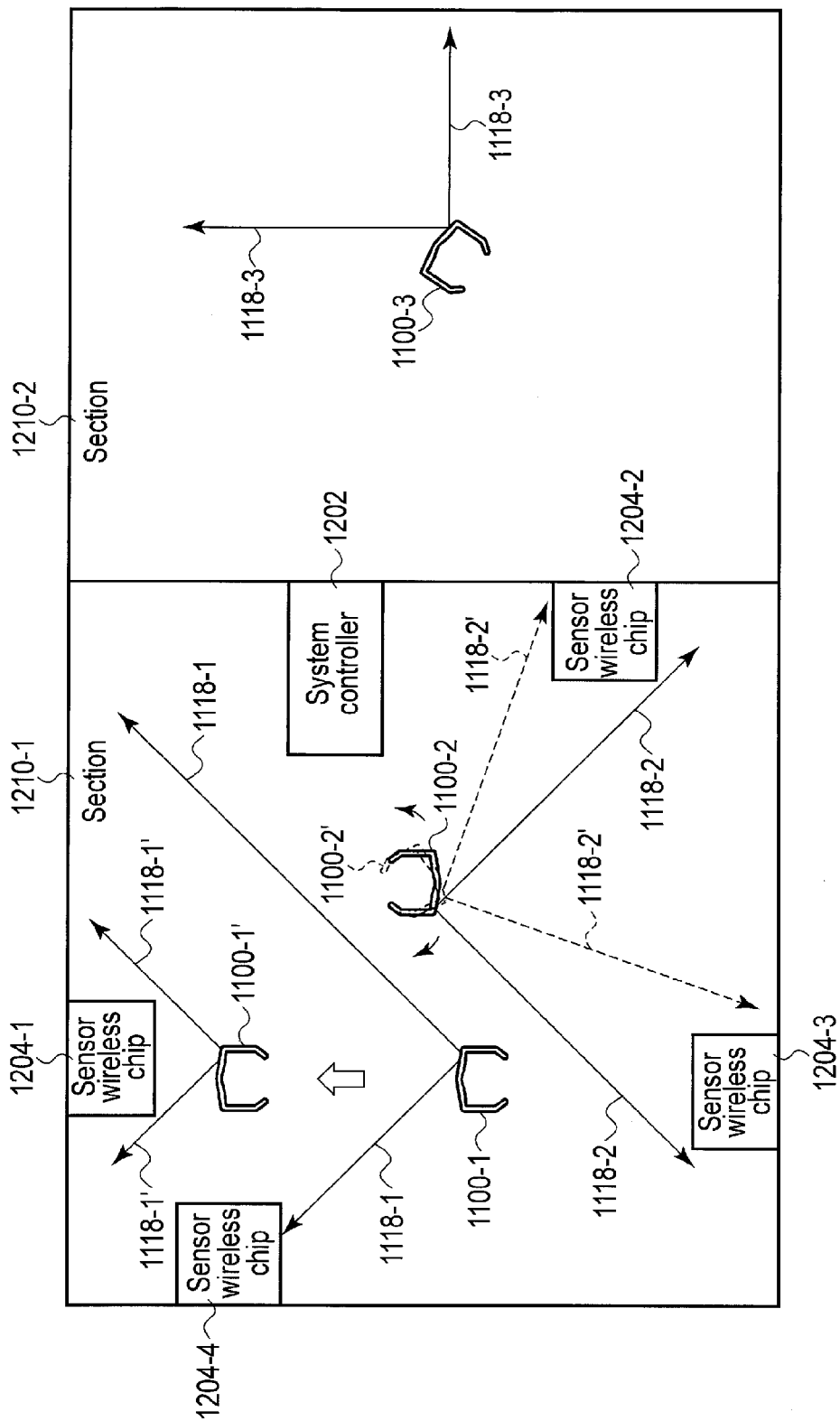
F I G. 14

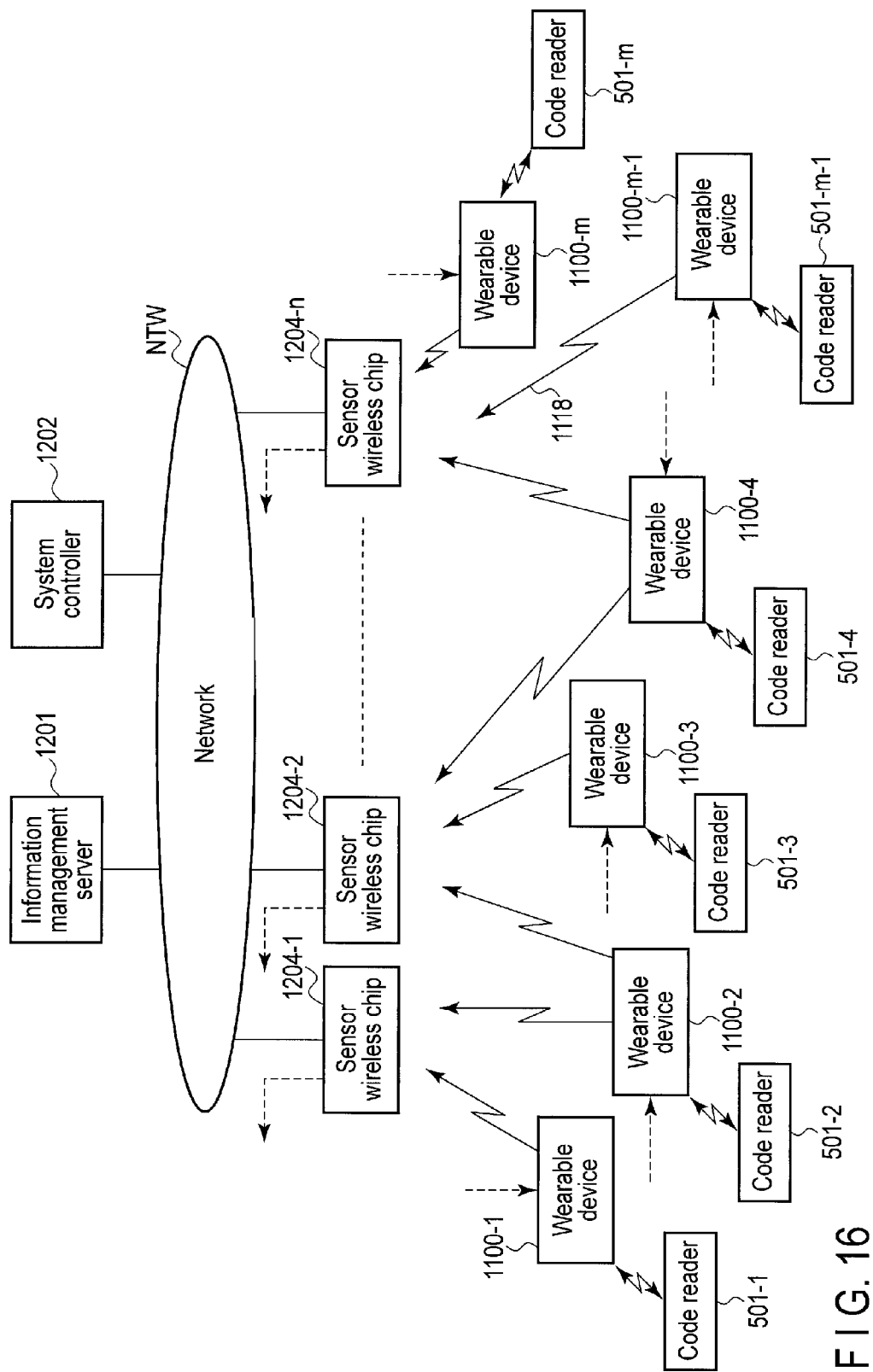
F I G. 16

SPECTACLE-TYPE ELECTRONIC DEVICE AND ASSISTING METHOD

CROSS-REFERENCE TO RELATED APPLICATIONS

This application is based upon and claims the benefit of priority from Japanese Patent Application No. 2015-173034, filed Sep. 2, 2015, the entire contents of which are incorporated herein by reference.

FIELD

Embodiments described herein relate generally to a spectacle-type electronic device and an assisting method.

BACKGROUND

Among electronic devices, a wearable device providing, for example, various types of video content or information such as messages in the extension of the wearer's line of sight, has been put into practical use. The wearable device of this type is useful for, for example, job assistance and process management for the wearer in a factory, or assistance of the wearer picking at a delivery office.

The wearable device can report the wearer's position information or action states, such as the information regarding the wearer's state that the wearer is moving around a certain point within a predetermined range, staying at a certain position and executing the repetitive actions, or is not moving at a position where the wearer stays, without requiring a direct operation from the wearer.

The wearable device can also virtually display information for job assistance of the wearer, in the extension of the wearer's line of sight.

Conversely, increase in the weight and size of the wearable device to allow the wearable device to report the information more concretely does not only reduce the wearing property of the wearable device, but also causes the wearable device to be separated (detached) from the wearer. In addition, a greater size of the system for analyzing the information reported by the wearable device and assisting the wearer, and the increase in the manufacturing costs are unacceptable today.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 shows an example of a system of recognizing an electronic device of an embodiment;

FIG. 4 shows an example of the system of recognizing the electronic device of an embodiment;

FIG. 7 shows an example of major elements of a system controller in the system of recognizing the electronic device of an embodiment;

FIG. 10 shows an example of a major configuration of the electronic device cooperating with the electronic device of an the embodiment;

FIGS. 12A and 12B each shows an example of displays displayed in the extension of the wearer's line of sight by the electronic device of an the embodiment;

FIG. 13 shows an example of a system of recognizing the electronic device of the embodiment;

FIG. 14 shows an example of a system of recognizing the electronic device of an embodiment;

FIG. 16 shows an example of a system of recognizing the electronic device of an embodiment.

DETAILED DESCRIPTION

Figure 2:
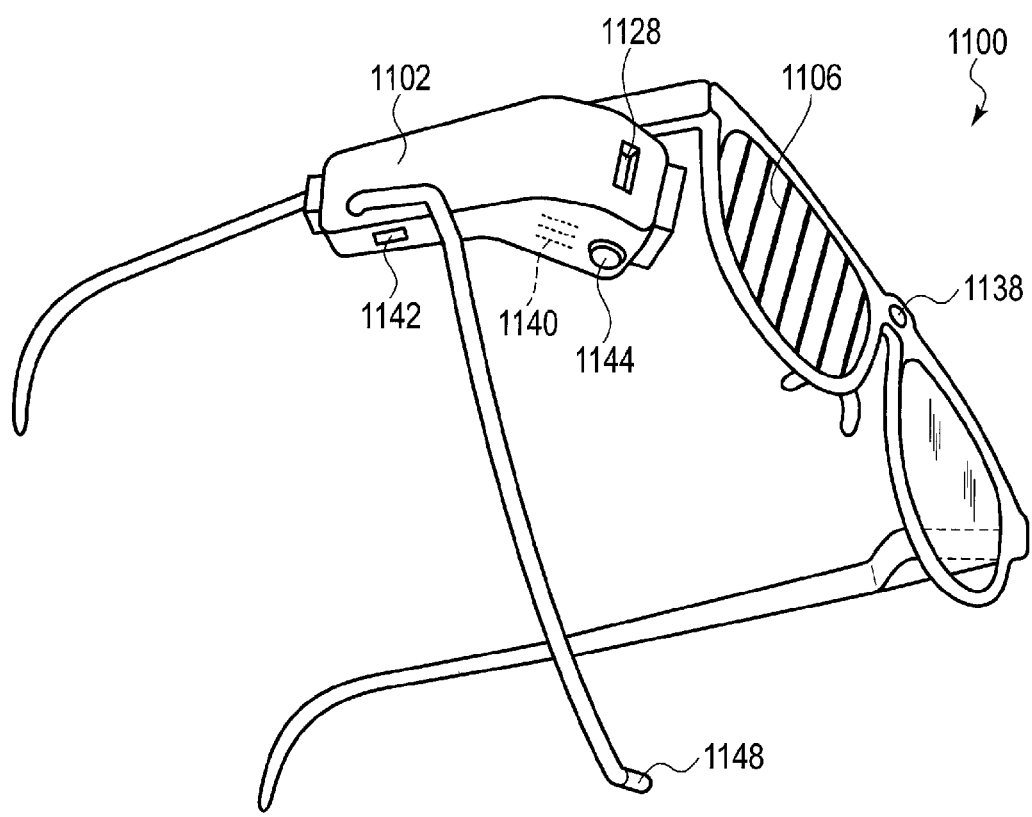
FIG. 2 shows an example of an example of a major configuration of the electronic device of an embodiment.

In general, according to one embodiment, a spectacle-type electronic device comprises: an image display which produces an image; a light source which applies illumination light to the image produced by the image display to illuminate the image; a signal processor which modulates the illumination light from the light source to form a signal including individual identification information; a screen positioned at a particular location within an extension of a wearer's line of sight to display the image produced by the image display and illuminated by the light source; and a communication processor which communicates with a corresponding electronic device to enable information of a target represented by the image displayed on the screen to be shared by the communication processor and the corresponding electronic device.

Embodiments will now be described hereinafter in detail with reference to the accompanying drawings.

FIG. 1 is a schematic illustration showing an example of a system of recognizing an electronic device of one of the embodiments.

In a component yard of a factory, a merchandise warehouse of a mail-order company, a delivery section (office) of a retail store, or the like, a system controller (manager terminal device) 1202 is arranged at a predetermined position, in a work area 1001 including an arbitrary number of work spaces or racks (merchandise shelves) A01 to Axy (where x and y are both positive integers), B01 to Bxy, 001 to Cxy, . . . , and X01 to XYxy. The system controller 1202 can execute transfer of a signal and/or data to or from an information management server 1201 in a network by a cable or wireless communication. The work area 1001 including the racks (work space) may be, for example, a work table or a production line (assembly space) in a factory, a table at school, a sitting location in a conference room, or the like. In addition, the work area 1001 may be, for example, a stock area (yard) in a delivery office.

At least one position information transmitter (sensor wireless chip), i.e., a predetermined number of position information transmitters (sensor wireless chips) 1204-1 to 1204-n (where n is a positive integer), capable of communicating with the information management server 1201 and/or the system controller 1202 are located in the work area (stock area) 1001.

The sensor wireless chips (position information transmitters) 1204 (-1 to -n, hereinafter represented by 1204 except that the chips or transmitters need to be specifically identified) recognize (detect) each of variations in the position, number and orientation, of worker terminals (wearable devices) 1100-1 to 1100-m (where m is a positive integer) to be explained with reference to FIG. 2 and FIG. 3, by a detecting method to be explained with reference to FIGS. 13, 14, 15A, 15B, 15C, 15D, 15E, 15F, 15G, 15H, 15I, 15J, 15K and 15L. By detecting the wearable devices (worker terminals) 1100 (-1 to -m, hereinafter represented by 1100 except that the terminals need to be specifically identified), positions, number and states of an arbitrary number of workers (wearers) holding the wearable devices 1100 can be detected.

Each of the workers (wearers) can move freely in the work area 1001. Each of the workers executes a predetermined specific job at a predetermined specific position, for example, in a work space 1242 which is a station, a container (a vessel), a movable table or the like. The work space 1242 may be a cart or the like moving together with the wearer (worker) in, for example, a delivery office. The wearer moving together with the work space (cart) 1242 wears, for example, a glove-type portable management device (often called an input-output device, a checker or a code reader) 501-1 to 501-p (where p is a positive integer) to be explained in subsequent descriptions with reference to FIGS. 7, 8A, 8B, and 9, on either of own hands, for example, a left hand. The management device 501 (-1 to -p, hereinafter represented by 501 except that the devices need to be specifically identified) is, preferably, a palm (back-of-hand)-integrated handy terminal (terminal device) which functions as, or example, a barcode reader.

Figure 3:
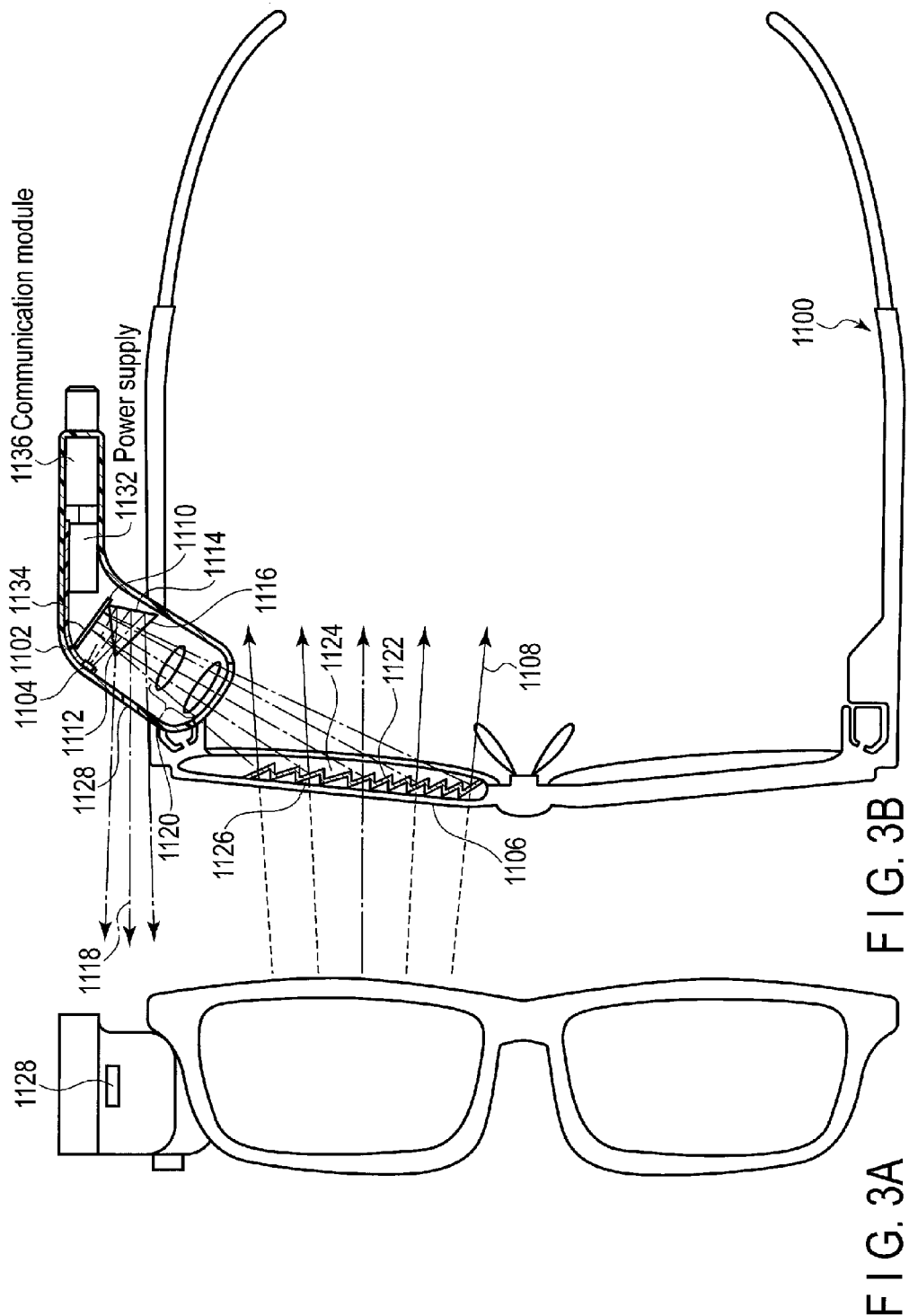
FIGS. 3A and 3B each shows an example of the major configuration of the electronic device of an embodiment.

FIGS. 2, 3A and 3B are schematic diagrams showing an example of a wearable device of one of the embodiments. The wearable device is a portable terminal device and may be, for example, a tablet computer (PC) or a smartphone. In addition, the wearable device (preferably) displays information received by an associated smartphone (tablet PC) with a smartphone (or a tablet PC) serving as a controller, (at a predetermined position) in the extension of the wearer's line of sight such that the information can be visually recognized in a hands-free state. The wearable device can acquire a predetermined instruction input (control information), based on the indication of intent of the wearer, using a camera function, a sound/speech acquisition function, a vibration detection function or the like. The wearer's indication of intent may be, for example, blocking a lens portion of a camera which realizes the camera function with the wearer's hand, requesting a next display by clapping hands or speech with respect to the sound/speech acquisition function, giving a predetermined vibration with respect to the vibration detection function, and the like. The embodiment will be hereinafter explained by assuming that the wearable device is a spectacle-type (or head-mounted display type) wearable device which can be used by the wearer (worker) in a hands-free state.

The wearable device 1100 comprises a projector (display information producer) 1102, a screen (optical path synthesizer) 1106, a driver (often called an image display circuit, a light source driving circuit or a signal processor) 1134, a wireless communication module 1136, and the like and operates with the power supplied from a power supply 1132 which is, for example, a button battery.

The projector 1102 executes communication, i.e., information transfer with the information management server 1201 and/or the system controller 1202 connected with an external network NTW shown in FIG. 4 or FIG. 16, through the wireless communication module 1136.

In addition, the projector 1102 comprises a light source module 1104, an additional image display module 1110, a half-mirror surface 1112, a total-reflection surface 1114, an emission surface 1116, a lens system 1120, and the like. The projector 1102 illuminates an image or information displayed by the additional image display module 1110 by non-parallel light (diverging light, hereinafter referred to as divergent light) 1108 emitted from the light source module 1104, and emits (outputs) the projected image which is the reflected light (of the illumination light).

Preferably, the light source module 1104 is a dimming-type white LED light source (L-cos) in which a plurality of, for example, three light emitting diodes (LED) are different in light color and an output light quantity of each diode can be varied independently. It should be noted that the luminescent color can be changed according to the use environment by using the dimming-type white LED light source for the light source module 1104, if the use environment of the wearable device 1100 is, for example, a clean room in which illumination including, for example, an orange color as its major color is commonly used. In addition, by using the dimming-type white LED light source as the light source module 1104, a display color which can easily be seen by the wearer can be output, and occurrence of troubles for the wearer such as eyestrain and a migraine caused by the eyestrain can be avoided as compared with a case of outputting a display color which is hard to be seen by the wearer.

The additional image display module 1110 is, for example, a reflection liquid crystal display (LCD) module, and displays a predetermined additional image based on display control of the driver 1134.

Light 1108 output from the light source module 1104 is reflected on the half-mirror surface 1112 to illuminate the additional image displayed by the additional image display module 1110, and is reflected again as additional image light (which may also be referred to as image light) corresponding to the additional image.

The driver 1134 also controls the light emission of the light source module 1104 in association with the additional image (additional image light) displayed on the additional image display module 1110.

The screen 1106 comprises a rear transparent refractor 1124, a Fresnel lens type half-mirror surface 1122, and a front transparent refractor 1126.

The light (image light) 1108 reflected on the additional image display module 1110 to the screen 1106 passes through the half-mirror surface 1112 and the emission surface 1116, and is given a predetermined image size by the lens system 1120, and reaches the Fresnel-lens-type half-mirror surface 1122 of the optical path synthesizer 1106.

Part of the additional image light 1108 which has passed through the lens system 1120 and reached the Fresnel-lens-type half-mirror surface 1122 of the screen 1106 is reflected on the Fresnel-lens-type half-mirror surface 1122 and forms a virtual image corresponding to the additional image (image light) displayed on the additional image display module 1110.

The screen 1106 allows a part of an image seen in the extension of the line of sight of the wearer (wearing the wearable device 1100), i.e., a background image to pass therethrough, and displays the image such that the wearer can visually recognize the image together with the image light corresponding to the additional image.

Part of the image light (divergent light) 1108 emitted from the light source module 1104 and passed through the half-mirror surface 1112 makes total reflection on the total-reflection surface 1114, refracted on the emission surface 1116, and becomes stray light 1118 (i.e., divergent light) from the light source module 1104. The leakage light 1118 is released to the outside through an opening or a gap (guide portion) 1128.

The wearable device 1100 also comprises a speaker 1140, a (slide) switch 1142, a (rotary) knob 1144, and the like, at a predetermined position of the projector 1102, for example, on a bottom surface portion of the projector 1102. The switch 1142 can adjust, for example, luminance of the additional image light 1108 emitted from the projector 1102. The knob 1144 can adjust, for example, an angle of projection of the additional image light 1108 emitted from the projector 1102. As an amount of adjustment at the switch 1142 and the knob 1144 can be set by different operations, the wearer (the user) can adjust the luminance and the angle of projection while visually checking the additional image projected onto the screen 1106, i.e., without looking at the switch 1142 and the knob 1144. In other words, display luminance and color tone of the additional image suitable for taste of the user (wearer) can be provided by operating the switch 1142. In addition, the angle of projection can be adjusted by the knob 1144 such that the additional image can be displayed at the most suitable position in accordance with the shape and size of the head of the user (the wearer). The elements to be adjusted by the switch 1142 and the knob 1144 may be exchanged, and the positions of the switch 1142 and the knob 1144 may also be exchanged.

A microphone 1148 for acquiring the wearer's speech (voice) is located at a predetermined position of the projector 1102 of the wearable device 1100, for example, an end of a stay extending from a portion connecting with the driver 1134.

FIG. 4 is a schematic block diagram showing the electronic device and major elements of the system of recognizing the electronic device, illustrating an example of mutual communication (transfer of information and/or data) between the system controller and the wearable device shown in FIG. 1.

The system controller 1202 and each wearable device 1100 can execute the mutual transfer of various types of data and control signals over the network NTW. The information management server 1201 is connected to the network NTW. Each wearable device 1100 receives a position reference signal output from the position information transmitter 1204 and detects (specifies) its own position. The wearable device 1100 reports the own position specified by the wearable device 1100 as the information on the position of the wearer, i.e., the worker, together with the worker ID (i.e., information for specifying the wearer) and the terminal ID (i.e., information for specifying the own terminal), to the information management server 1201 or the system controller 1202, over the network NTW, at regular time intervals. Each wearable device 1100 may transmit the information on the own position at, for example, predetermined timing corresponding to timing at which the position reference signal is output by the position information transmitter 1204.

Communication between the system controller 1202 (or the information management server 1201) and each wearable device 1100 may be executed by a cable or a wireless system. Preferably, the communication between the system controller 1202 (information management server 1201) and each wearable device 1100 is, for example, short-range wireless communication or, Bluetooth (registered trademark) conforming to the IEEE 802.11(b/g), and the like.

Each wearable device 1100 also transmits the worker state to the information management server 1201 when the wearable device 1100 transmits the information on the own position.

Each wearable device 1100 mutually communicates with the code reader 501 linked to (associated by one-to-one relationship with) the wearable device 1100 by short-range wireless communication. Preferably, the short-range wireless communication is at least one of Bluetooth (registered trademark), ZigBee (registered trademark) and Near Field Communication (NFC). Total number p of the code readers 501 is an arbitrary number including the number equal to, greater than, or smaller than m. It is prohibited to simultaneously associate at least two cord readers with one wearable device 1100, but combination (association) with the wearable device 1100 is arbitrary. In addition, association (link) of the code readers 501 with the wearable devices 1100 can be changed at any time. As regards the change of the association (link) of the code readers 501 with the wearable devices 1100, the wearable device 1100 once recognized maintains the association with the recognized code reader 501 until association with a next code reader 501 is instructed, unless a specific change instruction (control input of the system controller 1201) is transmitted.

Figure 5:
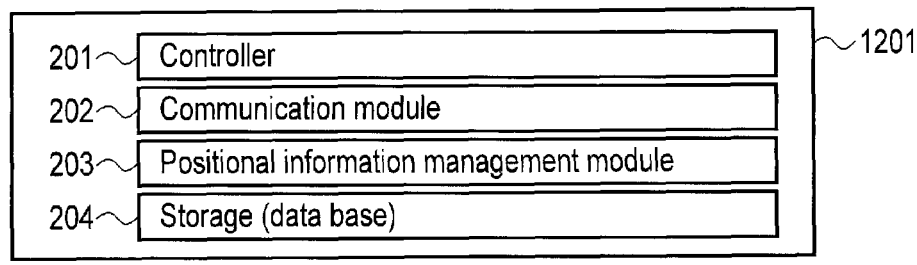
FIG. 5 shows an example of a major configuration of an information management server in the system of recognizing the electronic device of an embodiment.

FIG. 5 is a schematic block diagram showing major elements of the information management server shown in FIG. 1 and FIG. 4.

The information management server 1201 shown in FIG. 5 comprises at least a controller 201, a communication module 202, a position information management module 203, and a storage (a database) 204.

The controller 201 controls the entire information management server. The communication module 202 is connected to the network NTW, and controls communication, i.e., transfer of information with various devices located in the network, for example, system controller 1202, wearable device 1100 and/or positional information transmitter 1204.

The position information management module 203 manages the worker ID and the position of the worker and/or the manager (supervisor) ID and the position of the manager (supervisor), which are received from the wearable devices 1100 and the system controller 1202. The supervisor or the manager may be present separately or either of them may serve as the other. For example, when the work area expands to a plurality of buildings or floors, it can be assumed that a supervisor is present in each building or on each floor and that at least one manager managing the whole work area is present.

The storage (the database) 204 holds information on a read target object accepted (read) by the code reader 501 worn by the worker who is specified by the worker ID (terminal ID) received from an arbitrary wearable device 1100, information on a read target object which gives an instruction to the specified worker, and the like.

The storage (the database) 204 also holds information on a target object stored at a predetermined position in the work area 1001 by the worker wearing the wearable device 1100 (i.e., information read by the code reader 501 at the storage), in association with the work spaces or racks (merchandise shelves) A01 to Axy, B01 to Bxy, C01 to Cxy, ..., and X01 to XYxy in the work area 1001.

Figure 6:
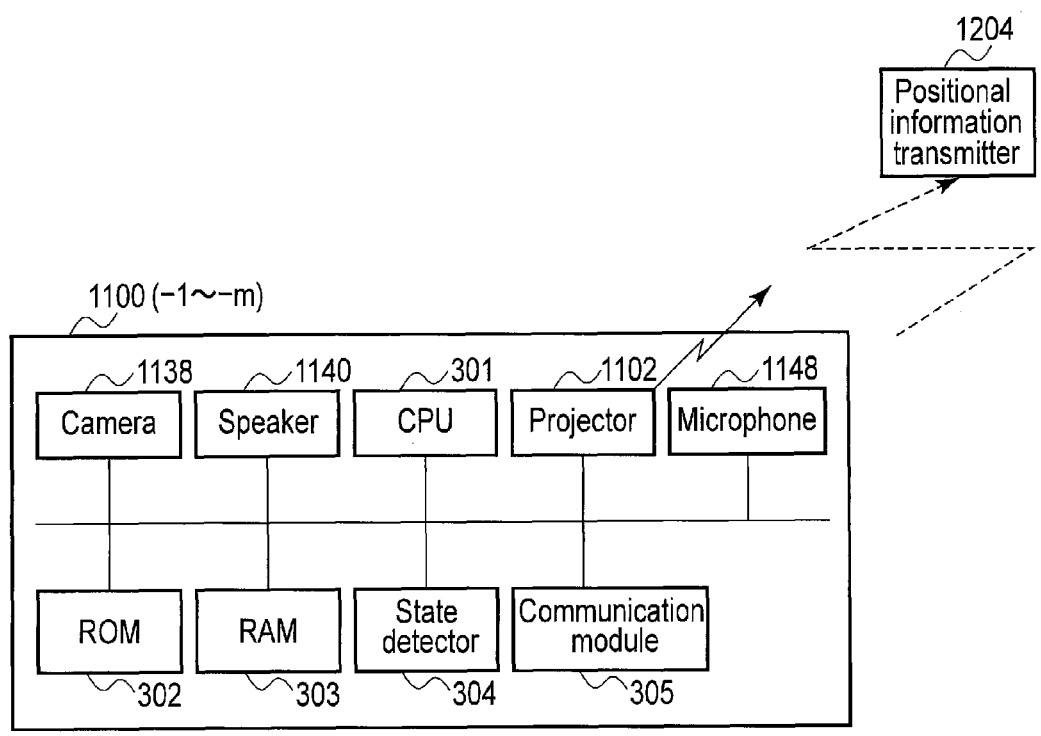
FIG. 6 shows an example of major elements of a wearable device of the system of recognizing the electronic device of an embodiment.

FIG. 6 is a schematic block diagram showing major elements of the wearable device shown in FIG. 1 and FIG. 4.

The wearable device 1100 shown in FIG. 6 comprises a ROM 302, a RAM 303, a state detector 304, a communication module 305, a projector (display information producer) 1102, a camera 1138, a speaker 1140, and a microphone 1148, each connected with a controller 301 comprising a processor (CPU), by a control bus.

The controller 301 controls the overall wearable device (worker terminal) in accordance with a program held in the ROM 302 using the RAM 303 as a work memory.

The state detector 304 comprises, for example, sensors such as an acceleration sensor and a gyroscope, and detects the worker state, based on information output from the acceleration sensor or the gyroscope. The worker state may be detected in the other method. The positional information transmitter 1204 may detect emission of light (leakage light 1118) from the projector 1102 of the wearable device 1100, which can be detected by the position information transmitter 1204, and report the worker's position information to the information management server 1201 or the system controller 1202, and the information management server 1201 or the system controller 1202 may detect the worker state, based on the position variation in time. The state detector 304 detects, for example, a movement of the wearer's head (variation in attitude) such as watching the target object (tilting the head at a predetermined angle for a certain period) or responding to the instruction from the system controller (manager) 1202 (nodding/shaking the head), a predetermined gesture, or the like. The position information transmitter 1204 can also report the worker state to the information management server 1201 or the system controller 1202 by detecting the emission of the light (leakage light 1118) from the projector 1102 of the wearable device 1100, which can be detected by the position information transmitter 1204, in a detection method to be explained with reference to FIGS. 13, 14, 15A, 153, 15C, 15C, 15E, 15F, 15G, 15H, 15I, 15J, 15K and 15L.

The communication module 305 communicates with the information management server 1201 or the system controller 1202 over the network NTW.

The camera 1138 images the situation which can be seen from the wearable device, and transmits an image to the information management server 1201 or the system controller 1202, in response to a transmission request from the manager (supervisor) or a transmission instruction of the worker who is the wearer (of the wearable device). The speaker 1140 notifies the worker who is the wearer (of the wearable device) of, for example, a message transmitted from the manager (supervisor) or information held in the information management server 1201, as speech information (that is, reproduces the speech information). The microphone 1148 accepts a response (speech) made by speech of the worker responding to the instruction from the system controller 1202, analog to digital converts the response, and notifies the system controller 1202 of the response via the communication module 305.

FIG. 7 is a schematic block diagram showing major elements and a configuration in the system controller shown in FIG. 1 and FIG. 4.

As shown in FIG. 7, the system controller 1202 comprises a ROM 402, a RAM 403, a display 404, a communication module 405, and a position detector 406, which are connected to a controller 401 including a processor (CPU) via a control bus and a data bus.

The system controller 1202 may be, for example, a stationary terminal used in a stationary state such as a personal computer (PC), as shown in FIG. 1, or a tablet PC which can be arbitrarily moved. Preferably, the system controller 1202 includes the hands-free-enabled display (wearable device) and a tablet PC or smartphone (controller), and the manager (or supervisor) can move in the state of wearing the (hands-free-enabled) display. More desirably, the (hands-free-enabled) display displays the information received by the personal computer (tablet PC) (at a predetermined position) in the extension of the wearer's line of sight.

The controller 401 controls the system controller 1202 in accordance with a program held in the ROM 402 using the RAM 403 as a work memory. The display 404 displays various types of information such as the position or state of the worker (or the fact that the worker is absent or is away from a predetermined position because of, for example, a sudden illness or the like), which is acquired via the wearable device, and a gesture. When the system controller 1202 is, for example, a tablet PC (or a smartphone) which can be moved to an arbitrary position, the position detector 406 receives position information transmitted from the position information transmitters 1204 (-1 to -n), and detects (specifies) the current position of the own system controller 1202. As explained above, the system controller 1202, using the wearable device 1100-x for the manager ("-x" is added for identification) as the display, may receive information transmitted by a control unit associated with the wearable device 1100-x and display (report) the received information to the manager. In this case, the wearable device 1100-x for the manager receives the position information transmitted by the position information transmitter 1204 (-1 to -n) and detects (specifies) the current position of the own terminal.

The manager's (supervisor's) position information and the manager (supervisor) ID as detected in the above-explained manner are transmitted to the information management server 1201 via the network NTW by the communication module 405.

The information management server 1201 manages the position of an arbitrary worker, and the state of the arbitrary worker or the position of the manager (supervisor) as required, which are acquired via the network NTW. By making an inquiry to the information management server 1201 by the system controller 1202, the manager (supervisor) can recognize the position and the state of the arbitrary worker.

In other words, the recognition system of the present embodiment can manage data such as the worker who is present, the place where the worker is located, and the state of the worker, by collecting the above-explained information by the information management server 1201. In addition, if the manager (supervisor) is movable, the recognition system of the present embodiment can recognize the position of the manager (supervisor) at predetermined timing.

Thus, the recognition system of the present embodiment can recognize the positions of the manager (supervisor) and the workers, respectively, and can also recognize the positions relative to the manager (supervisor), of the workers close to the manager (supervisor), the workers remote from the manager (supervisor) in a determined direction, and the like.

The information on the read target object which is read by the code reader 501 worn by the specified worker, information on the read target object transmitted to the specified worker, information on the target object stored at a predetermined position in the work area 1001 by the worker, and the like can be managed.

FIGS. 8A, 8B, 9 and 10 are schematic diagrams showing an example of a wearable device which can be used in cooperation with the wearable device explained with reference to FIGS. 2, 3A and 3B. The wearable device shown in FIGS. 8A, 8B, 9 and 10 is an example of a code reader (wearable handy terminal device) used when the wearer works or executes a predetermined operation, based on the target object or instruction displayed in the extension of a line of the wearer by the wearable device shown in FIGS. 2, 3A and 3B. The wearable device shown in FIGS. 8A, 8B, 9 and 10 is, for example, a barcode reader which the worker (wearer) can wear on a part of the body, preferably, a wearer's (worker's) hand (or arm) and use, in a picking job in a merchandise (component) warehouse or the like.

Figure 8:
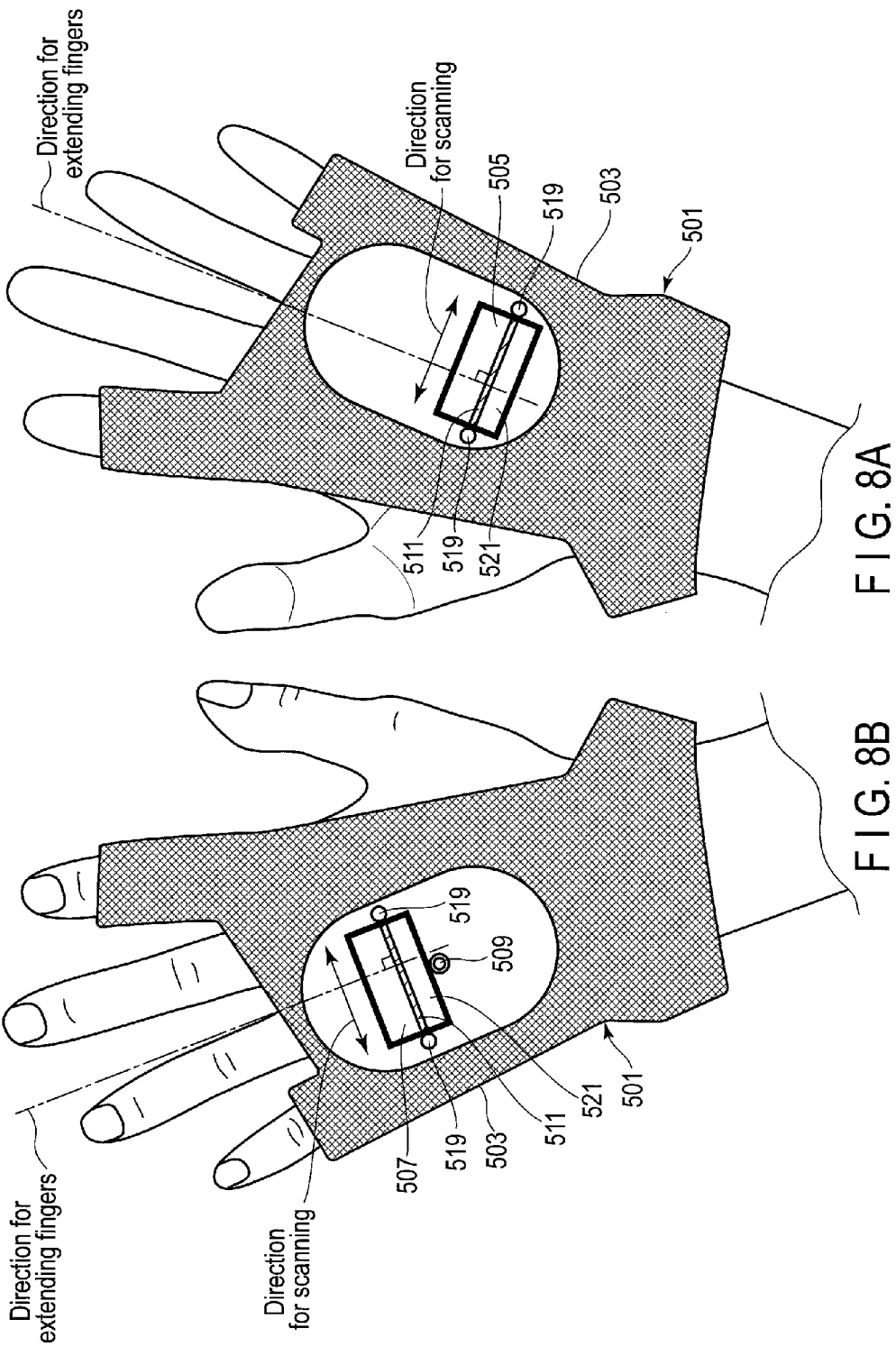
FIGS. 8A and 8B each shows an example of a major configuration of an electronic device cooperating with the electronic device of an embodiment.
Figure 9:
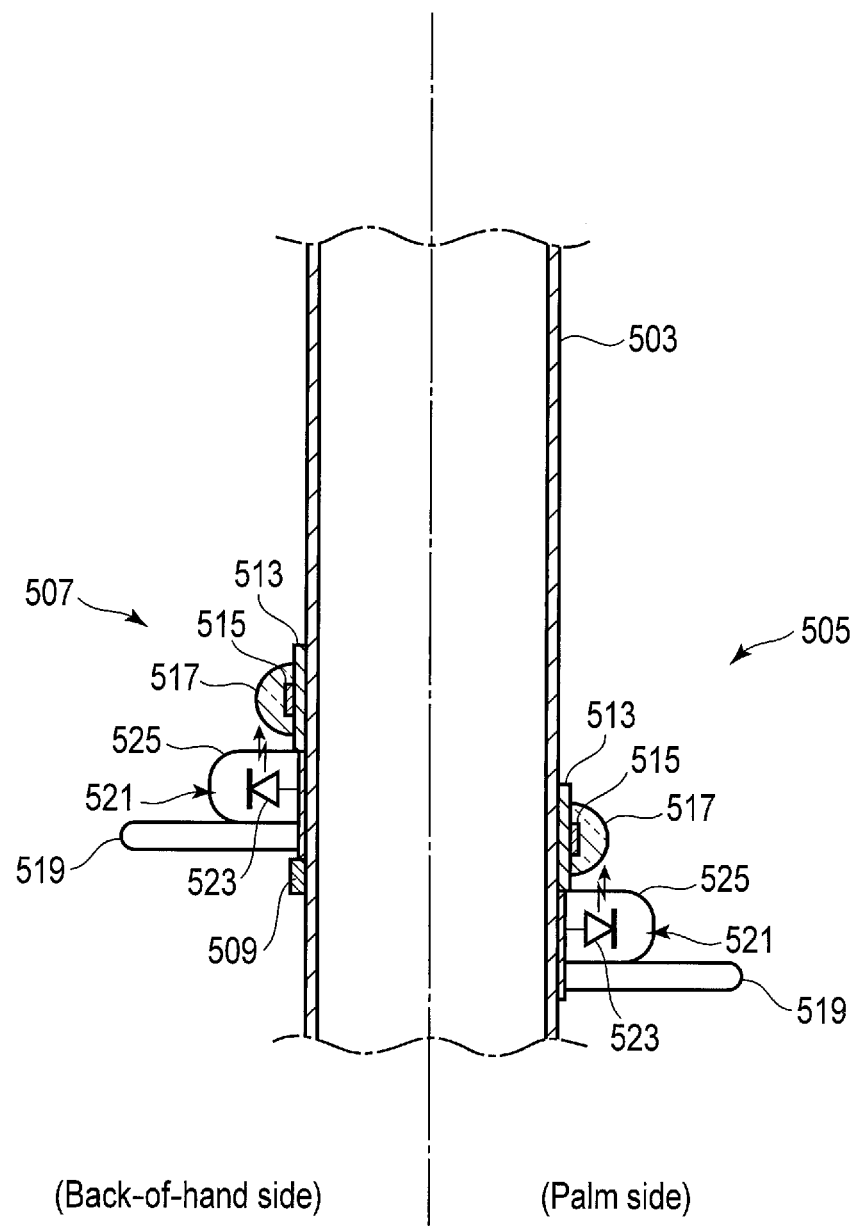
FIG. 9 shows an example of a major configuration of the electronic device cooperating with the electronic device of an embodiment.

The barcode reader (wearable device, hereinafter often called a code reader glove or a glove reader) 501 shown in FIGS. 8A, 8B and 9 is, for example, in a glove form, and comprises a glove body 503, a reading mechanism (first reading mechanism) 505 on a surface (first surface) side which is the wearer's palm side, and a reading mechanism (second reading mechanism) 507 on a surface (second surface) side which is the side of the back of the wearer's hand. In other words, the barcode reader glove 501 comprises the first reading mechanism (first barcode reader) 505 and the second reading mechanism (second barcode reader) 507, on both sides of the palm and the back of hand of the wearer, respectively.

Each of the reading mechanisms 505 and 507 comprises a plane-shaped reader 511 and a flexible illumination module (light source) 521. The second reading mechanism 507 on the surface side which is the side of the back of hand comprises, for example, a brightness sensor 509 capable of detecting the read target object located on the second reading mechanism 507 side, so as to operate only when the first reading mechanism 505 on the surface side which is the palm side is in a non-operating state. The barcode reader glove 501 shown in FIGS. 8A and 8B intends to be worn on the wearer's left hand, but the glove to be worn on the right hand can also be easily configured in a similar positional relationship. Preferably, a direction orthogonal to a direction for extending the wearer's fingers (particularly, middle finger) is the reading direction, in the reader 511. This enables a barcode portion on the target object to be read by natural movement of the wearer's hand made when the target object is read. In other words, if the orientation of the target object is defined such that the barcode portion of the target object stands upright when the wearer moves the hand (glove 501) closely to the target object to read the barcode on the target object, movement of the glove 503 to handle the target object is associated with a feature that alignment of the bar portion (reflectivity-variable area or, for example, black printing or the color of the material) of the barcode portion can easily match the scanning (reading) direction of the reader 511 of the glove 501, with the above alignment of the reader 511 of the code readers 505 and 507. A guide member 519 serves as a guide for reading end positions in the length direction of the barcode when the wearer moves the glove body 503 closely to the barcode of the target object such that a range to be read by a line sensor 515 can be visually recognized, or moves the barcode (display) area of the target object closely to the glove body 503.

As shown in FIG. 9, the reader 511 comprises a reinforcing member 513, a line sensor 515, the line sensor 515, a lenticular lens 517 (and a guide member 519; see FIGS. 8A and 8B, one member on a rear aide is seen in FIG. 9) and the like. The reinforcing member 513 is fixed to the glove body 503 integrally with the line sensor 515 located at a predetermined position on the glove body 503. The reinforcing member 513 suppresses variation in an interval of the barcode (interval of a background portion and the bar portion, i.e., the reflectivity-variable area) when light reflected from the barcode (of the target object) is made incident on the line sensor 515. The line sensor 515 receives the reflected light corresponding to the illumination light from the illumination module (light source) 521 and outputs brightness signals (brightness information) corresponding to the background portion and the bar portion, respectively. The lenticular lens 517 guides the reflected light from the barcode on the target object illuminated by the light source 521 to the line sensor 515.

The light source (illumination module) 521 outputs the illumination light to enable the line sensor 515 located at a predetermined position on the glove body 503 to receive the reflected light from the barcode on the read target object. The light source 521 comprises, for example, a light emitting diode (LED) array 523, a protection member 525 which covers and protects the LED array 523 and imparts flexibility to the LED array 523, and the like. The LED array 523 comprises an arbitrary number of LED elements. The protection member 525 holds each LED element, and is useful for outputting the illumination light even when the glove body 503 is deformed with its flexibility in accordance with the movement of the wearer's hand or the like. The protection member 525 is formed of a transparent material which is transparent to the wavelength of the light output from each LED element (with the transmittance of 90% or more) and contains, for example, vinyl chloride or butyl acetate with much flexibility.

FIG. 10 is a schematic block diagram showing major elements (signal processor) of the barcode reader shown in FIGS. 8A, 8B and 9.

In FIG. 10, a signal processor 531 of the barcode reader 501 comprises a control unit (CPU) 532, a switching controller 533, a lighting controller 534, an image processor 535, a communication module 536 and the like.

The CPU 532 configured to control operations of modules in the first barcode reader 505 and the second barcode reader 507, specifically, drives either of the first barcode reader 505 and the second barcode reader 507, based on the input from the brightness sensor 509, and executes subsequent (barcode) reading processing.

The lighting controller 534 turns on the light source 521 of either of the first barcode reader 505 and the second barcode reader 507, under control of the CPU 532.

The line sensor 515 of the barcode reader on the side corresponding to the light source turned on by the lighting controller 534 receives the light obtained by reflecting the light from the light source on the barcode of the target article, subjects the received light to photoelectric conversion and then analog to digital conversion, and outputs the light to the image processor 535.

The image processor 535 analyzes (encodes) the analog to digital converted barcode information and converts the information into a code string (barcode information signal) of a predetermined format corresponding to the barcode information. The image processor 535 also supplies the barcode information signal to the information management server 1201, via the communication module 536, over the network NTW.

Preferably, the signal processor 531 comprises, for example, a power supply from a battery or a rechargeable battery (secondary battery) at an arbitrary position in the glove body 503 and can operate by the barcode reader 501 alone. The communication module 536 of the signal processor 531 may be provided independently or, for example, the barcode reader 501 and connected with the signal processor 531 by, for example, a cable.

FIGS. 11A, 11B, 11C, 12A and 12B are schematic illustrations showing an example of display on the wearable device, at assistance to the worker's work in the work area using the wearable device explained with reference to FIGS. 2, 3A and 3B and the glove reader explained with reference to FIGS. 8A, 8B, 9 and 10 (i.e., reception of the instructions to the wearable device wearer and the information from the glove reader).

Figure 11A:
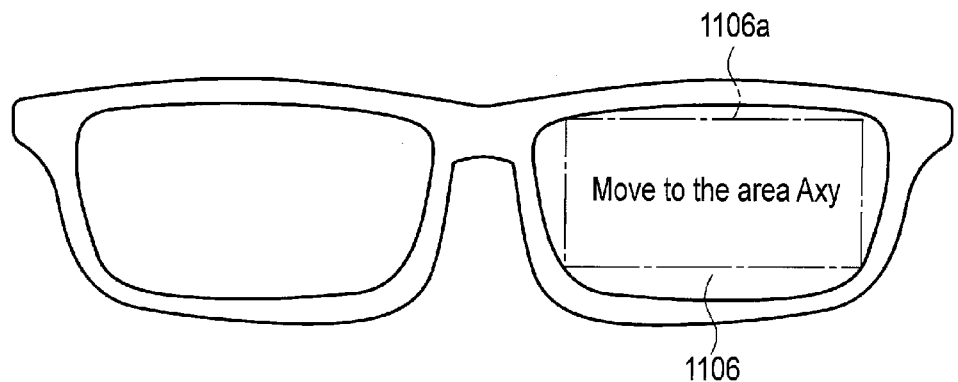
FIGS. 11A, 11B and 11C each shows an example of displays displayed in the extension of the wearer's line of sight by the electronic device of an the embodiment.
Figure 11B:
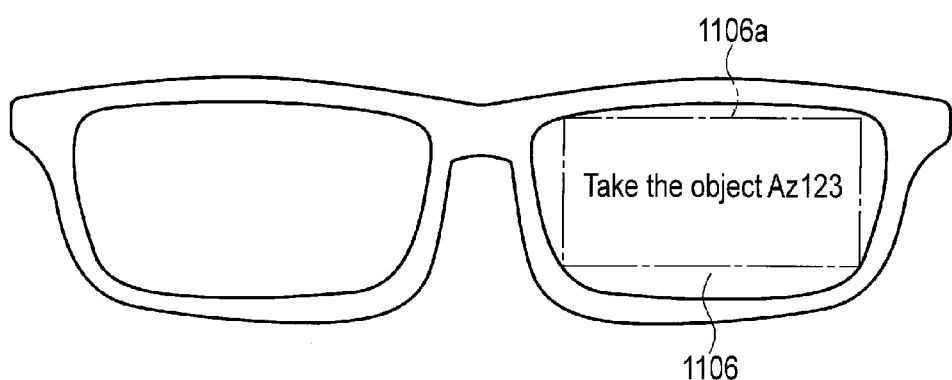
Figure 11C:
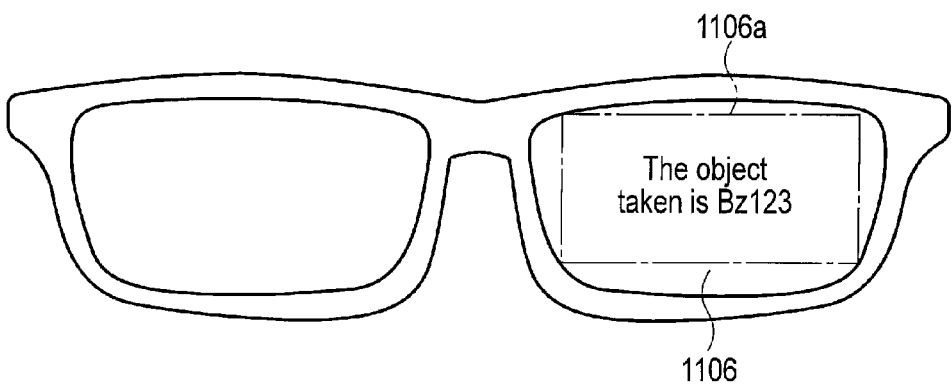

FIGS. 11A, 11B and 11C is a schematic illustration showing display examples of displaying, in the display area of the wearable device (electronic device) shown in FIGS. 2, 3A and 3B, the information for job assistance to the wearer further wearing an electronic device cooperating with the electronic device, so as to enable the information to be visually recognized in the extension of the wearer's line of sight.

FIG. 11A shows an example of the display made in a display area 1106a of the screen 1106 of the wearable device 1100 when a specified worker wears the wearable device 1100 and the barcode reader 501 in, for example, the work area 1001 shown in FIG. 1.

For example, when the specified worker is in a preparation completion (standby) state of wearing the wearable device 1100 and the barcode reader 501, the wearable device 1100 displays an instruction to move to a predetermined position (work area) as the information on the job assistance corresponding to the instruction from the system controller 1202, in the display area 1106a of the screen 1106. The worker may be specified (designated) from workers in a preparation completion (standby) state by, for example, the system controller (manager) 1202 or may be specified (designated) based on responses (preparation completion) from the workers standing by on a predetermined schedule (timetable). The system controller 1202 detects an element that the specified worker has reached a predetermined specified position, by a worker's predetermined response (repetition of a specific change of the leakage light from the wearable device 1100), report of arrival using the microphone 1148, or recognition of the specific operation using the camera 1138.

FIG. 11B shows an example of a display content in the display area 1106a of the screen 1106 in a case where the system controller 1202 transmits a next work instruction (assistance information), when it can be detected that the specified worker has moved to the instructed predetermined position, via the network NTW.

The system controller 1202 detects that the specified worker has reached the specified predetermined position, and transmits the information on the next job assistance which should be displayed by the wearable device 1100, (to the corresponding wearable device 1100) via the network NTW. The wearable device 1100 displays an instruction for taking out (picking) object A, as the information on the job assistance corresponding to the instruction from the system controller 1202, in the display area 1106a of the screen 1106.

The system controller 1202 detects termination of picking (taking out object A) by the reception of the barcode information signal corresponding to the barcode information of the barcode on object A which has been read by the barcode reader 501 worn by the worker, and transmits the assistance information of a subsequent work or information on the work termination or the like. As regards reading the barcode by the barcode reader 501, the barcode can easily be read by, for example, moving the first code reader 505 closely to a barcode display of object D001 in a predetermined distance or moving the barcode display of object D001 closely to the second code reader 507.

The system controller 1202 determines that the object picked by the worker is correct (i.e., the object which the worker has been instructed to pick), based on the barcode information signal. If the picked object is different from the object which the worker has been instructed to pick, the system controller 1202 transmits repetition of work (picking) to the wearable device 1100.

FIG. 11C shows an example of display that a message to be transmitted to the wearable device 1100 is displayed in the display area 1106a of the screen 1106 in a case where the system controller 1202 detects that the object picked by the specified worker, via the network NTW, is different from the object which the worker has been instructed to pick.

If the system controller 1202 notifies the wearable device 1100 that the picked object is different from the object which the worker has been instructed to pick, the wearable device 1100 displays an instruction to repeat the work (picking) in the display area 1106a of the screen 1106 such that the worker can visually recognize the instruction in the extension of the line of sight.

FIGS. 12A and 12B is a schematic illustration showing display examples of displaying, in the display area of the wearable device (electronic device) shown in FIGS. 2, 3A and 3B, the information for assistance to the work of the wearer further wearing an electronic device cooperating with the electronic device, so as to enable the information to be visually recognized in the extension of the wearer's line of sight.

FIG. 12A shows an example of the display made in the display area 1106a of the screen 1106 of the wearable device 1100 when a specified worker wears the wearable device 1100 and the barcode reader 501 in, for example, the work area 1001 shown in FIG. 1.

The wearable device 1100 accepts, for example, an instruction for a work of storing the object recognized by the barcode reader 501 at a predetermined position in the work area 1001, and displays movement to the storage position in the display area 1106a of the screen 1106.

FIG. 12B shows an example of a display content in the display area 1106a of the screen 1106 in a case where the system controller 1202 transmits a next work instruction (assistance information), when it can be detected that the specified worker has moved to the instructed predetermined position, via the network NTW.

The wearable device 1100 displays an instruction for storage of object D001 as the information on the job assistance corresponding to the instruction from the system controller 1202, in the display area 1106a of the screen 1106. At this time, the worker reads the barcode of stored object D001 by the barcode reader 501. The barcode information of the read barcode is converted into a barcode information signal by the barcode reader 501, and the barcode information signal is input to the information management server 1201 by communication with the information management server 1201 via the network NTW and stored in the storage 204 of the information management server 1201. As regards reading the barcode by the barcode reader 501, the barcode can easily be read by, for example, moving the first code reader 505 closely to the barcode display of object D001 in a predetermined distance or moving the barcode display of object D001 closely to the second code reader 507.

The system controller 1202 detects that object D001 has been stored, and transmits the assistance information for a subsequent job, and information such as termination of the work to the wearable device 1100 worn by the worker.

FIG. 13 is a schematic illustration showing a basic concept of the detection system of the embodiment using the leakage light from the light source module of the wearable device. In other words, the position of the wearable device (the wearer) and the wearer's state can be detected by using the leakage light from the wearable device shown in FIGS. 2, 3A and 3B.

The detection system shown in FIG. 13 comprises at least one wearable device 1100 (-1 to -m), at least one sensor wireless chip 1204 (-1 to -n), and one system controller 1202. They can transfer the information by mutual communications. The mutual communications may be wired or wireless communications but should, desirably be, for example, short-range wireless communications, particularly, Bluetooth. More desirably, as they cooperate with each other via the short-range wireless communications, cooperative operations and cooperative processing can be executed without being affected by the free movement (or change in the arrangement location) of the wearable device 1100 (or the sensor wireless chip 1204).

In the detection system of the embodiment, the light 1108 output from the light source module 1104 of the wearable device 1100 is intermittently modulated by using information including identification information of the wearable device (identification; hereinafter often referred to as a terminal ID) such that individual identification information, i.e., an arbitrary number of wearable devices 1100 can be identified. I.e., the light 1108 emitted from the light source module 1104 is modulated by an information signal including the terminal ID. In other words, in the detection system of the embodiment, the wearable device 1100 is used as an "information transmission source" by using the leakage light 1118. As explained above, the wearable device 1100 can be made multifunctional by assigning the wearable device 1100 an information transmission function besides the display function which is widely known for the wearable device 1100. Then, variety of the system comprising the wearable device 1100 can be achieved.

As the method of modulating the amount of light emission of the light source module 1104, for example, a chopper-type modulation scheme of reducing the amount of light emission to zero is not employed, but a modulation scheme of maintaining the amount of light emission more than a predetermined amount even if the light amount is small is adopted. The strain on the wearer's eyes can be thereby reduced. As regards the modulation scheme, for example, a digital sum value (DSV) free modulation scheme (i.e., a scheme of calculating DSV of a modulated signal at any time and enabling the bit inversion code to be arbitrarily inserted to reduce the direct current component to zero) is adopted. Thus, variation in the amount of light emission can be suppressed in a comparatively long range (i.e., variation in the amount of light emission can be macroscopically reduced to zero at any time) and the strain on the wearer's eyes can be further reduced.

An effect of reducing the strain on the wearer's eyes can also be produced by setting the reference frequency of the modulation to be greater than or equal to 10 Hz, for example, greater than or equal to 20 Hz, preferably, greater than or equal to 60 Hz since the eye of a person can recognize a variation of approximately 0.02 seconds. In contrast, since the LED used in the light source module 1104 has an inner impedance and connection capacitance, the modulation frequency of good accuracy should preferably be lower than 100 MHz, more desirably, lower than or equal to 10 MHz. Therefore, the reference frequency of modulation at the light source module 1104 used in the detection system of the embodiment should preferably be in a range of 10 Hz to 100 MHz, more desirably, 10 Hz to 10 MHz.

In addition, the leakage light 1118 which is the divergent light from the light source module 1104 is used in the detection system of the embodiment. The amount of the light detected by the sensor wireless chip 1204 is thereby varied in accordance with a distance δ between the wearable device 1100 and the sensor wireless chip 1204. By using this phenomenon, a distance between the wearable device 1100 and the sensor wireless chip 1204 (or the orientation of the wearable device 1100 to the sensor wireless chip 1204) can be predicted.

The light can be detected within a comparatively wide range by using the divergent light as the leakage light 1118 from the light source module 1104. As a result, by merely installing a comparatively small number of sensor wireless chips 1204 (-1 to -n), detection of the position of the wearable device 1100 (i.e., a distance between the wearable device 1100 and each sensor wireless chip 1204) or detection of the orientation of the wearable device 1100 (the orientation of the wearable device 1100 to each sensor wireless chip 1204) can be carried out. An expense required to install the detection system can be thereby reduced.

The light amount information of the leakage light 1118 (transmitted light 1158) from the light source module 1104, which is detected by the sensor wireless chip 1204, is transmitted from the sensor wireless chip 1204 to the system controller 1202 (or the information management server 1201) at predetermined timing. The system controller 1202 analyzes the information from the sensor wireless chip 1204 which is collected by the system controller 1202 (or compiled in the information management server 1201). The position of the arbitrary wearable device 1100 (-1 to -m), i.e., the wearer, and the wearer's state can be thereby estimated.

In the embodiment shown in FIG. 13, the sensor wireless chip 1204 is fixed to a working position 1206 (i.e., the racks or work spaces A01 to Axy, B01 to Bxy, C01 to Cxy, . . . , and X01 to XYxy in FIG. 1), and the wearable device 1100 is movable. However, the sensor wireless chip 1204 (and the working position 1206) may also be movable. In this case, the movement state of the sensor wireless chip 1204 (and the working position 1206) may be read by the wearable device 1100 arranged at a determined position (fixed position).

FIG. 14 is a schematic illustration or explanation of a concrete example of use of the system of recognizing the electronic device of the embodiment.

In FIG. 14, an interior of a system managed by the system controller 1202 (i.e., the work area 1001 in FIG. 1) is divided into two sections 1210-1 and 1210-2. Sections 1210-1 and 1210-2 may be, for example, sections divided by a partition.

In FIG. 14, the wearable device 1100-1 (first wearer) and the wearable device 1100-2 (second wearer) move in section 1210-1 while the wearable device 1100-3 (third wearer) is positioned at a predetermined position (i.e., stays at substantially a constant position) in section 1210-2. It is assumed that four sensor wireless chips (positional information transmitters) 1204-1 to 1204-4 are arranged in section 1210-1. The amount of light (the leakage light 1118) from the arbitrary wearable devices 1100 (-1 to -3) in section 1210-1 is detected by the respective sensor wireless chips 1204-1 to 1204-4. The sensor wireless chips 1204-1 to 1204-4 execute analog-to-digital (AD) conversion of the amounts of light (leakage light 1118) which have been detected by the respective sensor wireless chips 1204-1 to 1204-4, and transmit the amounts of light to the system controller 1202 as the light amount information corresponding to the amounts of light, by the short-range wireless communication, at predetermined timing.

In FIG. 14, the wearable device 1100-1 moves to the direction of the sensor wireless chip 1204-1 in accordance with the wearer's movement, and the orientation of the wearable device 1100-2 temporarily changes in accordance with the wearer's arbitrary movement, for example, shaking the head (nodding) or moving the head around. FIGS. 15A, 15B, 15C, 15D, 15E, 15F, 15G, 15H, 15I, 15J, 15K and 15L each shows a change in the chronological detection information in the system controller 1202 at this time.

FIGS. 15A, 15B, 15C, 15D, 15E, 15F, 15G, 15H, 15I, 15J, 15K and 15L each shows a chart of an example of employing an intermittent time-variation system as a system of modulating the leakage light 1118 from the light source module 1104 of each of the wearable devices 1100-1 to 1100-3. That is, the modulation timing is shifted in each of wearable devices 1100-1 to 1100-3 (i.e., modulation periods of the respective wearable devices are shifted).

As shown in FIGS. 15A, 15B, 15C, 15D, 15E, 15F, 15G, 15I-1, 15I, 15J, 15K and 15L, wearable device ID modulation periods 1304 are set intermittently for the first wearable device 1100-1, and the other periods are set as non-modulation periods 1302. In the ID modulation period 1304 of the first wearable device 1100-1, a pair of a synchronous signal SYNC (FIG. 15L) and the wearable device identification information (identification; hereinafter referred to as a terminal ID) are formed (with a one-to-one correspondence). Such pairing is repeated several times (i.e., times of multiples of four corresponding to the number (n) of sensor wireless chips 1204 (-1 to -n) in the example shown in FIGS. 15D, 15E, 15F and 15G, and FIGS. 15H, 15I, 15J and 15K).

An ID modulation period 1306 of the second wearable device 1100-2 starts simultaneously with entry of the first wearable device 1100-1 in the non-modulation period 1302. Similarly, an ID modulation period 1308 of the third wearable device 1100-3 starts simultaneously with entry of the second wearable device 1100-2 in the non-modulation period 1302.

In ID modulation period 1306 of the second wearable device 1100-2 and ID modulation period 1308 of the third wearable device 1100-3, synchronous signal SYNC (FIG. 15L) and the identification information (terminal ID) of each wearable device 1100 are modulated repeatedly. Thus, by incorporating the identification information (terminal ID) of each wearable device 1100 into the modulated signal, the identification information (terminal ID) can be detected in the system controller 1202. Since the system controller 1202 is thereby able to confirm the identification information (terminal ID) of each wearable device parallel with the detection timing, identification accuracy of the wearable device is enhanced.

In the above-explained example, the modulation timings of respective wearable devices 1100-1 to 1100-3 are time-divided (i.e., set intermittently). However, the modulation in the detection system of the embodiment is not limited to the above and, for example, the identification information of all the wearable devices 1100-1 to 1100-3 may be modulated sequentially and the modulation reference frequencies of the respective wearable devices 1100-1 to 1100-3 may be varied. In addition, frequency spectrum properties of the respective wearable devices may be varied at spread spectrum.

As shown in FIGS. 15D, 15E, 15F and 15G, periods 1310 of information communication from the sensor wireless chips are time-divided finely. Then, timings of communication with the system controller 1202 are shifted from each other, in each of the sensor wireless chips 1204-1 to 1204-4. This communication timing is managed by the system controller 1202.

Figure 15:
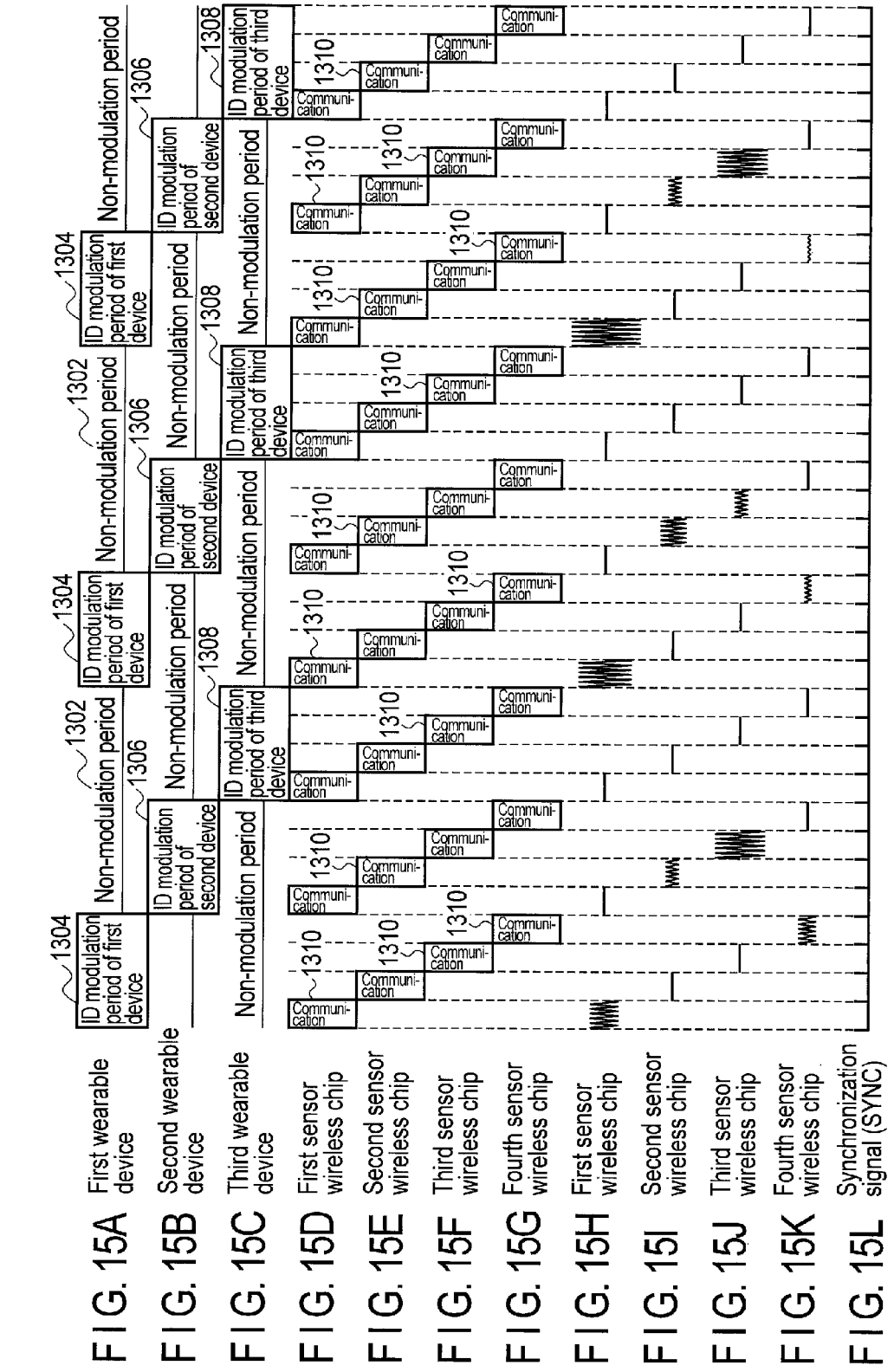
FIGS. 15A, 15B, 15C, 15D, 15E, 15F, 15G, 15H, 15I, 15J, 15K and 15L each shows a chart of an example of a system of recognizing the electronic device of an embodiment.

In FIG. 14, part of the leakage light 1118-1 from the light source module 1104 of the spectacle-type wearable device 1100-1 reaches the sensor wireless chip 1204-4 at the initial time. For this reason, as shown in FIG. 15K, the sensor wireless chip 1204-4 detects the modulated leakage light 1118-1 from the light source module 1104 of the wearable device 1100-1, at the initial time. However, as the wearable device 1100-1 moves toward the sensor wireless chip 1204-1, a modulated signal amplitude of the leakage light 1118-1 from the light source module 1104 of wearable device 1100-1, which is detected by the sensor wireless chip 1204-4, is decreased (FIG. 15K). In contrast, the modulated signal amplitude of the leakage light 1118-1 from the light source module 1104 of the wearable device 1100-1, which is detected by the sensor wireless chip 1204-1, is increased as the time elapses. Thus, by comparing temporal changes in the modulated signal amplitudes detected by the individual sensor wireless chips 1204 (-1 to -n) in the system controller 1202, the temporal change in the position of the wearable device 1100 (-1 to -m) (i.e., the movement state), which is the target of detection, can be estimated.

Meanwhile, when the wearable device 1100-2 is directed toward the sensor wireless chip 1204-3, at the early time, an amount of detection in the sensor wireless chip 1204-3, of the modulated signal amplitude which can be obtained from leakage light 1118-2 from the light source, is greater than that in the sensor wireless chip 1204-2. At this time, it is assumed that, for example, the wearer shakes the head and temporarily faces in the direction of the sensor wireless chip 1204-2. Then, a detection output (of the wearable device 1100-2) from the sensor wireless chip 1204-2 is temporarily increased in accordance with the leakage light 1118-2' from the light source module 1104 as shown in FIG. 15I (and then decreased). Meanwhile, a detection output (of the wearable device 1100-2) from the sensor wireless chip 1204-3 is temporarily decreased in accordance with the leakage light 1118-2' from the light source module 1104 and then increased again as shown in FIG. 15J.

Thus, by comparing the temporal changes in the modulated signal amplitudes detected by the individual sensor wireless chips 1204 in the system controller 1202, a temporal change in the direction of the wearable device 1100 (-1 to -m), which is the target of detection, can also be estimated.

The above-explained examples of detection indicate the wearer's movement and shaking the head as wearer's actions. However, the wearer's actions are not limited to these and other various behaviors of the wearer may be utilized as the wearer's actions. For example, the leakage light 1118-2 from the light source module 1104 may be temporarily shielded by the movement of the wearer's hand or intentional twisting of the upper body (executed by the wearer). In this case, temporary decrease occurs in the modulated signal amplitude in common (in the same time band) in all the sensor wireless chips 1204-1 to 1204-4. Thus, user's different behavior patterns can be identified by comparing the relevances of the changes in modulated signal amplitudes of all the sensor wireless chips 1204-1 to 1204-4.

By utilizing the above method, not only the user's behaviors can be recognized, but the user's intention can be transmitted to the system controller 1202. As a result, not only the information can be received from the system controller 1202 in one way, but bidirectional information transmission between the user and the system controller 1202 can be executed.

FIG. 16 is a schematic block diagram showing the main elements in the system of recognizing the electronic device, illustrating an example of notifying the system controller or the information management server of the identification information (terminal ID) from the wearable devices shown in FIG. 4.

In the system of recognizing the electronic devices shown in FIG. 16, the information management server 1201 and the system controller 1202 are connected to the network NTW. An arbitrary number of sensor wireless chips (positional information transmitters) 1204-1 to 1204-n (where n is a positive integer) are connected to the network NTW. The wearable devices 1100-1 to 1100-m (where m is a positive integer) are associated with the respective glove readers (wearable handy terminals) 501-1 to 501-p explained with reference to FIGS. 8A, 8B, 9 and 10, by one-to-one relationship.

In accordance with the output instructions from the system controller 1202, the wearable devices 1100-1 to 1100-m receive timing signals (polling) output from the sensor wireless chips (positional information transmitters) 1204-1 to 1204-n at predetermined timings, respectively. The timing signals (polling) include information on the timing at which each of the wearable devices 1100-1 to 1100-m outputs its own identification information (terminal ID). As exemplified in FIGS. 15A, 15B, 15C, 15D, 15E, 15F, 15G, 15H, 15I, 15J, 15K and 15L, each of the wearable devices 1100-1 to 1100-m superposes its own identification information (terminal ID) on the light 1108 output from the projector 1102 in the intermittent ID modulation periods defined by the received timing signals, that is, a period including the ON time of a predetermined length and the OFF time of a predetermined length which are repeated at regular time intervals. Accordingly, the light output from the projector 1102 is the light modulated by a specific signal capable of displaying the own terminal ID unique to each of the wearable devices 1100-1 to 1100-m. The arbitrary sensor wireless chips 1204-1 to 1204-n detect the leakage light 1118 of the light 1108 output from the wearable devices 1100-1 to 1100-m. Each of the sensor wireless chips 1204-1 to 1204-n reports the worker ID (information for specifying the wearer) and the terminal ID of the detected wearable devices 1100-1 to 1100-m to the information management server 1201 (or the system controller 1202) through the network NTW at regular time intervals.

By thus employing the recognition system of the embodiment, the wearable device and the code reader cooperating with the wearable device, which are worn by the worker, the work efficiency of the worker can be enhanced in a component yard of a factory, a merchandise warehouse of a mail-order company, a delivery section of a retail store, or the like. In other words, the worker (i.e., the wearer of the wearable device and the code reader cooperating with the wearable device) can efficiently pick the object of target while referring to the job assistance information displayed by the display mechanism of the wearable device. In addition, the worker has no risk of picking a wrong object by working based on the job assistance information. Furthermore, when the object is stored, the efficiency of picking of the object can be enhanced and the target object can be stored by merely storing the target object at the position corresponding to the instruction from the system controller and reading the object information by the code reader, in accordance with the job assistance information displayed by the display mechanism of the wearable device.

In addition, the system controller (supervisor terminal) can easily acquire the information such as the situation and ending of the picking executed by the specified worker (instructing the work).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A spectacle-type electronic device comprising:
   an image display which produces an image;
   a light source which applies illumination light to the image produced by the image display to illuminate the image;
   a signal processor which modulates the illumination light from the light source to form a signal including individual identification information;
   a screen positioned at a particular location within an extension of a wearer's line of sight to display the image produced by the image display and illuminated by the light source; and
   a communication processor which communicates with a corresponding electronic device to enable information of a target represented by the image displayed on the screen to be shared by the communication processor and the corresponding electronic device.

2. The spectacle-type electronic device of claim 1, wherein the screen simultaneously displays the image and a background seen within the extension of the wearer's line of sight.

3. The spectacle-type electronic device of claim 2, further comprising:
   a guide system which guides the illumination light from the light source in a direction different from a direction of the screen.

4. The spectacle-type electronic device of claim 1, wherein the signal processor receives an instruction for transmission of the individual identification information.

5. The spectacle-type electronic device of claim 1, wherein the image display comprises a reflective liquid crystal display element.

6. The spectacle-type electronic device of claim 1, wherein the communication processor compares information of the target recognized by the corresponding electronic device with information of the target represented by the image.

7. The spectacle-type electronic device of claim 1, wherein the communication processor receives at least one of an instruction for transmission and image data corresponding to the image produced by the image display.

8. An assisting method in a spectacle-type electronic device including an image display which produces an image, a light source, a signal processor, a screen positioned at a particular location within an extension of a wearer's line of sight to display the image produced by the image display and illuminated by the light source, and a communication processor which communicates with an electronic device to enable information of a target represented by the image displayed on the screen to be shared between the communication processor and the electronic device, the method comprising:

applying, by the light source, illumination light to the image produced by the image display to illuminate the image;

modulating, by the signal processor, the illumination light from the light source to form a signal including individual identification information; and causing the image display to produce information available for job assistance of the wearer as the image.

9. The assisting method of claim 8, wherein the image and a background seen within the extension of the wearer's line of sight are simultaneously displayed on the screen.

10. The assisting method of claim 8, further comprising:

determining a wearer's position based in part on light from a guide system of the illumination light from the light source.

11. A spectacle-type electronic device comprising:

an image display which produces an image;

a light source which applies illumination light to the image produced by the image display to illuminate the image;

a signal processor which modulates the illumination light from the light source to form a signal including individual identification information; and a communication processor which communicates with an electronic device to enable information of a target represented by the image produced by the image display to be shared between the communication processor and the electronic device.

12. The spectacle-type electronic device of claim 11, further comprising:

a screen which displays the image produced by the image display and is illuminated by the light source.

13. The spectacle-type electronic device of claim 12, further comprising:

a guide system which guides the illumination light from the light source in a direction different from a direction of the screen.

14. The spectacle-type electronic device of claim 13, wherein the signal processor receives an instruction for transmission of the individual identification information.

15. The spectacle-type electronic device of claim 13, wherein the communication processor compares information of the target recognized by the electronic device with information of the target represented by the image.

16. The spectacle-type electronic device of claim 12, wherein the signal processor receives an instruction for transmission of the individual identification information.

17. The spectacle-type electronic device of claim 12, wherein the communication processor compares information of the target recognized by the electronic device with information of the target represented by the image.

18. The spectacle-type electronic device of claim 11, wherein the signal processor receives an instruction for transmission of the individual identification information.

19. The spectacle-type electronic device of claim 18, wherein the communication processor compares information of the target recognized by the electronic device with information of the target represented by the image.

20. The spectacle-type electronic device of claim 11, wherein the communication processor compares information of the target recognized by the electronic device with information of the target represented by the image.

* * * * *